United States Patent [19]
Kou

[11] Patent Number: 5,303,234
[45] Date of Patent: Apr. 12, 1994

[54] RANDOM ACCESS DATA COMMUNICATION SYSTEM WITH SLOT ASSIGNMENT CAPABILITY FOR CONTENDING USERS

[75] Inventor: Yukari Kou, Tokyo, Japan
[73] Assignee: NEC Corporation, Tokyo, Japan
[21] Appl. No.: 913,684
[22] Filed: Jul. 15, 1992
[30] Foreign Application Priority Data
  Jul. 15, 1991 [JP] Japan .................. 3-199977
[51] Int. Cl.⁵ .................. H04J 3/26
[52] U.S. Cl. .................. 370/85.2; 370/94.1; 370/95.3
[58] Field of Search .......... 370/85.2, 85.3, 85.7, 370/95.1, 95.3, 104.1, 94.1

[56] References Cited
U.S. PATENT DOCUMENTS
4,641,304  2/1987  Raychaudhuri ............. 370/95.3
5,012,469  4/1991  Sardana ..................... 370/95.3

Primary Examiner—Benedict V. Safourek
Assistant Examiner—Melvin Marcelo
Attorney, Agent, or Firm—Foley & Lardner

[57] ABSTRACT

In a random access communication system comprising a central station and user stations, each user station transmits a packet to the central station on a randomly selected timeslot of a time-division multiple access channel and defines a plurality of "minislots" within the selected timeslot and transmits a burst on one of the minislots. The central station monitors the defined monislots to detect the burst transmission, and assigns as many timeslots as required if more than one burst transmission is detected within a timeslot interval. A slot assignment signal is sent from the central station to the user stations containing a negative acknowledgment of the transmitted packet. The user station from which the packet was transmitted is responsive to the negative acknowledgment to select one of the assigned timeslots and retransmit to the central station a copy of the packet on the selected assigned timeslot.

14 Claims, 10 Drawing Sheets

PACKET FORMAT
(TERMINAL STATION)

FIG. 5A
TIMESLOT STATUS TABLE 22

|  | TIMESLOT #1 | TIMESLOT #2 | ------- | TIMESLOT #K |
|---|---|---|---|---|
| FRAME #1 | "1" | "0" | ------- | "1" |
| FRAME #2 | "0" | "0" | ------- | "0" |
| FRAME #3 | "1" | "0" | ------- | "1" |
| FRAME #4 | "0" | "0" | ------- | "1" |
| ⋮ | ⋮ | ⋮ | ⋮ | ⋮ |
| FRAME #N | "0" | "0" | ------- | "0" |

LEGEND: "1" = BUSY, "0" = IDLE

FIG. 5B
MINISLOT STATUS & ASSIGNED TIME SLOT IDENTIFIERS

LEGEND: MS = minislot, FR = frame, TS = timeslot

FIG. 6

FIG. 7A — TRANSMIT SLOT TABLE 56

| FRAME | TIMESLOT #1 | | | | | | TIMESLOT #K | | | | |
|---|---|---|---|---|---|---|---|---|---|---|---|
| | MINISLOTS | | | | | | MINISLOTS | | | | |
| | #1 | #2 | #3 | #4 | #5 | | #1 | #2 | #3 | #4 | #5 |
| #i | 0 | 1 | 0 | 0 | 0 | ------- | 0 | 1 | 0 | 0 | 0 |
| #(i+1) | 0 | 0 | 1 | 0 | 0 | ------- | 0 | 0 | 1 | 0 | 0 |

LEGEND: 1 = BUSY, 0 = IDLE

FIG. 7B — RESERVATION TABLE 57

| | TIMESLOT #1 | TIMESLOT #2 | ------- | TIMESLOT #K |
|---|---|---|---|---|
| FRAME #1 | 1 | 0 | ------- | 1 |
| ⋮ | ⋮ | ⋮ | ⋮ | ⋮ |
| FRAME #N | 0 | 0 | ------- | 0 |

LEGEND: 1 = BUSY, 0 = IDLE

FIG. 7C — ASSIGNMENT TABLE 58

| | TIMESLOT #1 | TIMESLOT #2 | ------- | TIMESLOT #K |
|---|---|---|---|---|
| FRAME #1 | 1 | 0 | ------- | 0 |
| ⋮ | ⋮ | ⋮ | ⋮ | ⋮ |
| FRAME #N | 0 | 0 | ------- | 0 |

LEGEND: 1 = BUSY, 0 = IDLE

FIG. 7D

| TIMESLOT | #j | #(j+1) | #(j+2) |
|---|---|---|---|
| RESERVATION TABLE | 1 | 0 | 1 |
| ASSIGNMENT TABLE | 1 | 0 | 0 |

ASSIGNED TO HOME STATION ←
RANDOMLY ACCESSIBLE ←
ASSIGNED TO ANOTHER STATION ←

RANDOM ACCESS DATA COMMUNICATION SYSTEM WITH SLOT ASSIGNMENT CAPABILITY FOR CONTENDING USERS

BACKGROUND OF THE INVENTION

The present invention relates to a time-division multiple access communication system in which user packets are transmitted on a randomly selected timeslot for accessing a central station. Specifically, this invention relates to a contention technique associated with collision of data due to simultaneous packet transmissions from contending users. The present invention is particularly suited for satellite communications systems.

With a random access satellite communication system using slotted time intervals, known as the slotted ALOHA system, short-delay communication is possible between a user terminal and a central host computer when the rate of message occurrences is relatively low. However, with an increasing rate of message transmissions, data collisions occur with an increasing rate. Under such circumstances, it is likely that retransmissions encounter collision with new packet transmissions, and the channel utilization efficiency of the system is severely degraded. This problem arises from the fact that, since each user station has no knowledge on the status of every timeslot of the access channel, it is impossible for user stations to control their packet transmissions when a data collision occurs between other stations.

SUMMARY OF THE INVENTION

It is therefore an object of the present invention to provide a random access communication system which ensures high channel utilization efficiency even when the system is carrying heavy user traffic.

This object is achieved by defining "minislots" in a timeslot which is randomly selected by each user station for packet transmission to a central station, randomly selecting one of the minislots for burst transmission and monitoring the minislots at the central station for assigning timeslots if more than one minislot is detected within a timeslot.

According to the present invention, there is provided a random access communication system comprising a central station and a plurality of user stations. Each of the user stations transmits a packet to the central station on a randomly selected timeslot of a time-division multiple access channel and defines a plurality of "minislots" or short-duration slots within the selected timeslot and transmits a burst on one of the short-duration slots. The central station monitors the defined short-duration slots to detect the burst transmission, and assigns as many timeslots as required if more than one burst transmission is detected within a same timeslot, and transmits a slot assignment signal to the user stations containing a negative acknowledgment of the transmitted packet. The user station from which the packet was transmitted is responsive to the negative acknowledgment to select one of the assigned timeslots and retransmit to the central station a copy of the packet on the selected assigned timeslot.

Preferably, the central station transmits a status signal indicating the status of each short-duration slot, and the packet-sending user responds to the status signal by determining the relative position of the short-duration slot on which the burst was transmitted and selecting one of the assigned timeslots according to the determined position. In addition, the central station detects an error in the packet and transmits a negative acknowledgment under conditions that a burst transmission is not detected in any of the short-duration slots, and that a burst transmission is detected only in one of the short-duration slots and an error is detected in the packet. In response to such a negative acknowledgment, the sending user station retransmits a copy of the packet on a randomly selected timeslot.

BRIEF DESCRIPTION OF THE DRAWINGS

The present invention will be described in further detail with reference to the accompanying drawings, in which.

DETAILED DESCRIPTION

Figure 1:
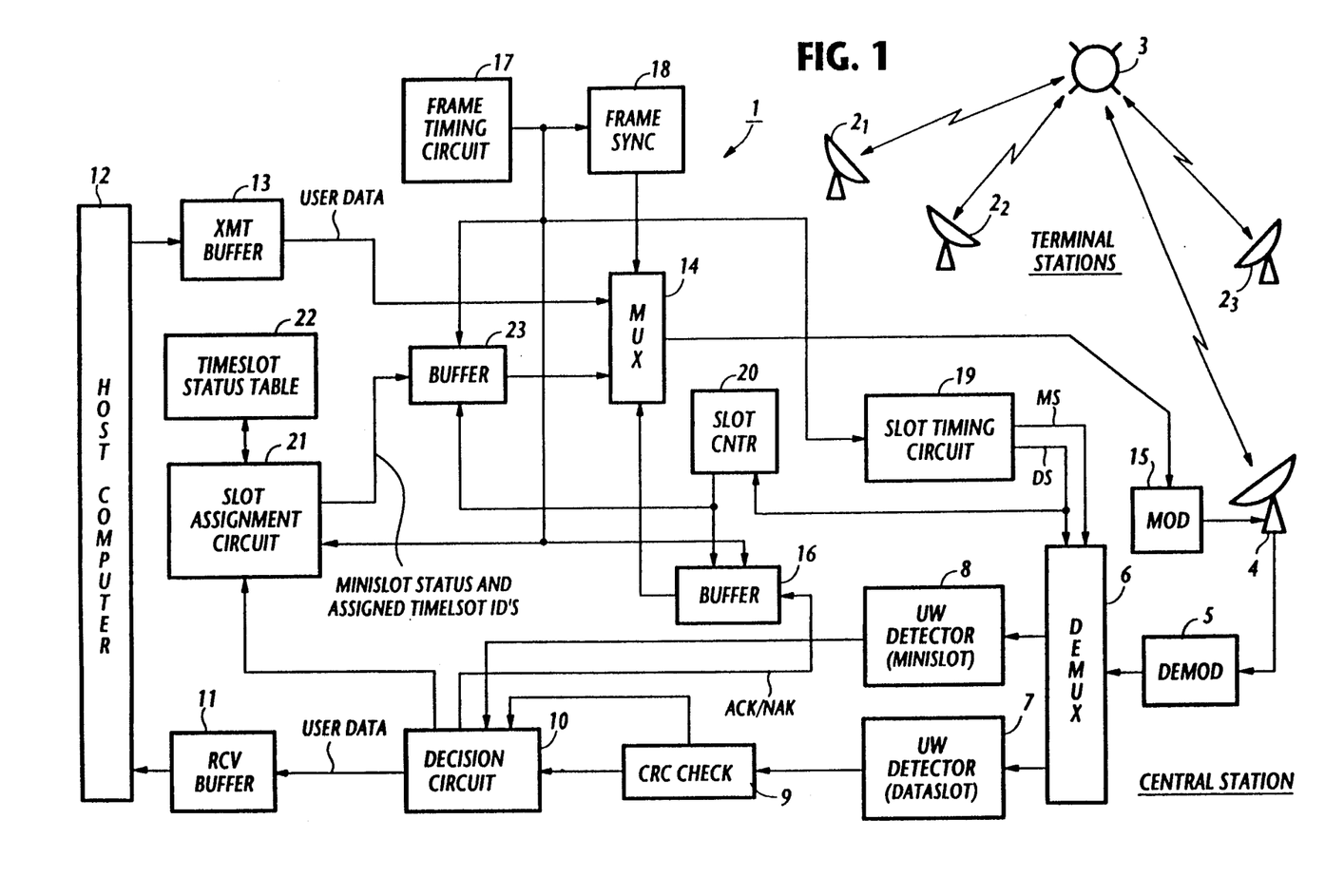
FIG. 1 is a block diagram of a satellite communications system according to the present invention, showing details of a central station.

Referring now to FIG. 1, there is shown a TDMA (time-division multiple access) satellite communications system according to the present invention. The system comprises a central station 1 and a plurality of remote terminal stations 2, shown at $2_1$, $2_2$ and $2_3$ for simplicity. Each terminal station gains access to a host computer located in the central station via a satellite 3 by transmitting a packet in a randomly selected timeslot and, in response, the central station sends back data obtained from the computer in a broadcast mode in a frame sequence to the terminal station. When a collision occurs between packets simultaneously transmitted from two terminal stations, the central station proceeds to assign two timeslots and notifies the identifications of the assigned timeslots to the sending stations to allow retransmission of the corrupted packets. To permit the central station to detect such data collisions, each terminal station defines "minislots" in a specified portion of a randomly selected timeslot and a "dataslot" immediately following the minislots, and randomly selects one of the minislots and transmits a preamble and a unique word in the selected minislot followed by the transmission of a packet in the dataslot in which a preamble and a unique word are transmitted as well in a conventional manner.

Figure 2:
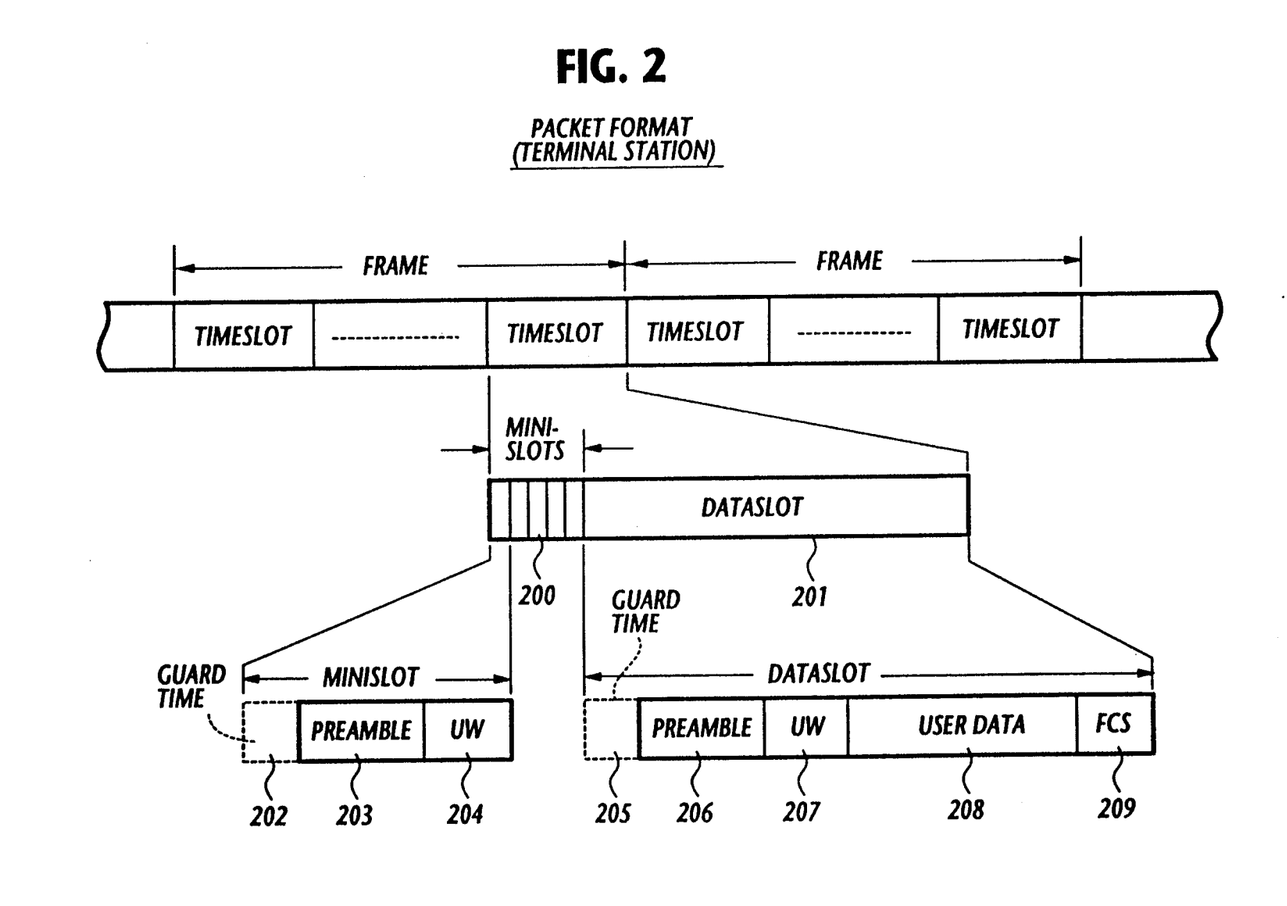
FIG. 2 shows a packet format used by the terminal stations of the system.

As illustrated in FIG. 2, the packet format of each terminal station 2 is such that each timeslot comprises a minislot interval 200 defining a plurality of minislots and a dataslot 201. The number of minislots contained in each timeslot is determined on a statistical analysis of the traffic data of the system, and corresponds to a maximum number of terminal stations likely to transmit packets simultaneously. In a typical example, five minislots are indicated in FIG. 2. Each minislot is a burst transmission and comprises a guard time 202, followed by a subfield 203 containing a preamble and a unique word subfield 204 signifying the beginning of a burst transmission. Dataslot 201 is also a burst transmission including a guard time 205, a preamble 206, a unique word 207 identical to that used in the minislot, a user data field 208 and a frame check sequence 209.

Figure 3:
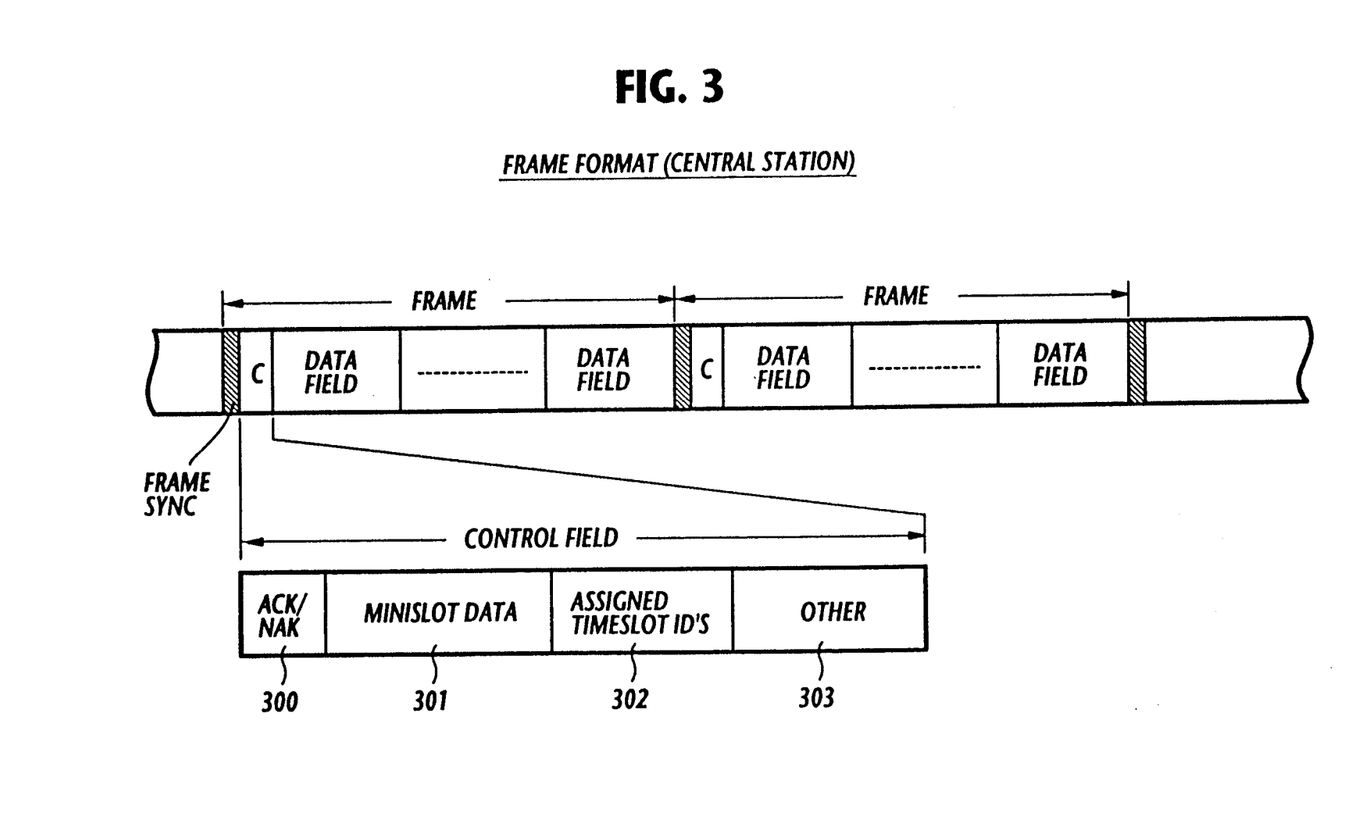
FIG. 3 shows a frame format of the central station.

As shown in FIG. 3, the frame format of the central station is such that each frame comprises a frame sync that defines the start timing of the frame, a control field and a plurality of data fields. The control field comprises an ACK/NAK subfield 300 for transmitting a positive or negative acknowledgment of a packet, a minislot data subfield 301 for indicating the busy/idle status of minislots contained in a frame. The minislot subfield 301 is followed by an assignment subfield 302 in which identifiers of assigned timeslots are inserted. Other control data is inserted in a subfield 303.

Returning to FIG. 1, the central station receives downlink signals from the satellite and transmits an uplink signal through an antenna system 4 including a low-noise amplifier, a high power amplifier, and up-and down-converters. The signal detected by the antenna is converted to an intermediate frequency by the down-converter of the antenna system, and further converted to a baseband frequency by a demodulator 5. The output of demodulator 5 is coupled to a demultiplexer 6 in which the received signal is decomposed by dataslot and minislot timing signals from a slot timing circuit 19 and supplied to a dataslot unique word detector 7 and a minislot unique word detector 8.

The unique word of the sending terminal station is detected by each of the unique word detectors 7 and 8 if the packet from the station is properly received by the central station, and the user packet data contained in the data field 208 and the frame check sequence 209 are passed on to a CRC (cyclic redundancy check) circuit 9 to detect and correct errors and ascertain the validity of the contents of the user data. If the user data is verified, the CRC circuit 9 produces an ACK signal, otherwise it produces a NAK signal. The user data checked by CRC circuit 9 is applied to a decision circuit 10 to which the output of UW detector 8 and the error presence/absence data from CRC circuit 9 are also applied.

The user data stored in the receive buffer 11 is fed into a host computer 12 where it is processed and stored into a transmit buffer 13 where it is kept until the central station is ready for transmission through a path including a multiplexer 14 and a modulator 15 whose output si coupled to the up-converter of the antenna system 4 for transmission to the satellite.

A frame sync generator 18 is connected to the frame timing circuit 17 to generate a frame synchronization bit sequence which is multiplexed by multiplexer 14 to define the start timing of the frame.

If a burst transmission from a terminal station is properly received in the minislot interval 200 of a timeslot, the unique word detector 8 produces an output indicating that a minislot is used by a terminal station. If more than one burst is detected in the minislot interval 200, UW detector 8 will produce two output signals in response thereto. If the same minislot is used by two terminal stations, collision is said to occur and the unique words contained in such minislot are corrupted and made to appear as noise. Under such circumstances, the unique word detector 8 produces an output indicating the absence of a burst transmission in any of the minislots of a timeslot.

Figure 4:
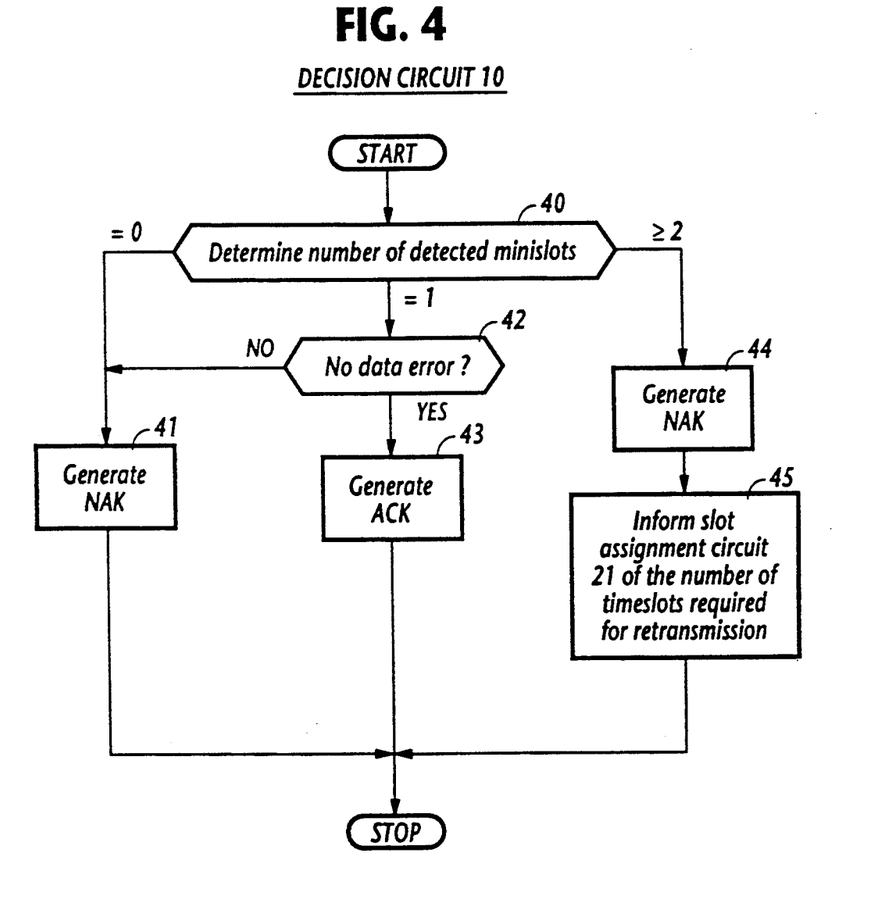
FIG. 4 is a flowchart showing programmed instructions executed by a decision circuit of FIG. 1.

Decision circuit 10 monitors the output of UW detector 8 to check to see if it has detected more than one unique word from the minislots of each timeslot. If this is the case, decision circuit 10 recognizes that a data collision has occurred, makes an unfavorable decision and discards the data that follows the minislots and supplies a signal indicating the number of minislots detected in a timeslot and the busy/idle status of the minislots of the timeslots to a slot assignment circuit 21. If only one unique word is detected in a timeslot, decision circuit 10 determines that a packet is properly received and allows the data part of the packet to be stored into the receive buffer 11. As illustrated in FIG. 4, decision circuit 10 checks the output of minislot UW detector 8 and determines the number of detected minislots detected during a timeslot interval (step 40). If the number of detected minislots is 0, a NAK signal is generated (step 41). If the number of detected minislots is equal to 1, the result of error check by CRC circuit 9 is examined (step 42). If a data error is present, a NAK signal is generated (step 41) and if no data error exists, an ACK signal is generated (step 43). If the number of detected minislots is equal to or greater than 2, then a NAK signal is generated (step 44) and the number of timeslots required for retransmission is informed to the slot assignment circuit 21.

The ACK/NAK data from decision circuit 10 is stored into a buffer 16 in a location determined by an address pointer from a timeslot counter 20 using a dataslot timing signal DS from timing circuit 19. ACK/NAK data for a given frame is then output from buffer 16 in response to a timing signal supplied from a frame timing circuit 17, and multiplexed into the ACK/NAK subfield 300 of the frame and transmitted with the user data from transmit buffer 13.

In response to the signal indicating the number of minislots being used, slot assignment circuit 21 proceeds to assign as many timeslots as there are minislots detected by decision circuit 10 by using data stored in a timeslot status table 22. System simplification is achieved by assigning timeslots to contending terminal stations on an en bloc basis, rather than specifying one-to-one correspondence between the assigned timeslots and the contending terminal stations.

Figure 5A:
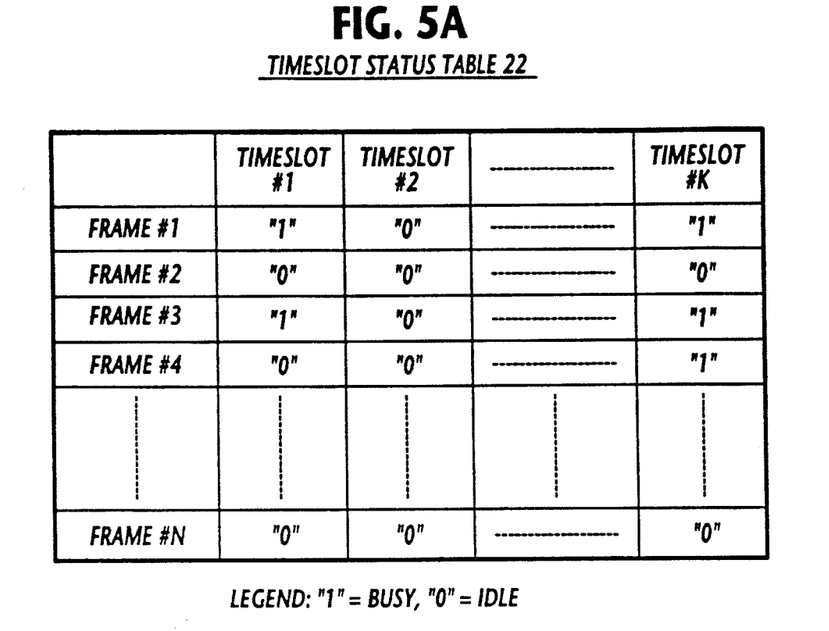
FIG. 5A shows details of the timeslot status table of FIG. 1, and FIG. 5B showing a format of minislot status and slot assignment data.
Figure 5B:
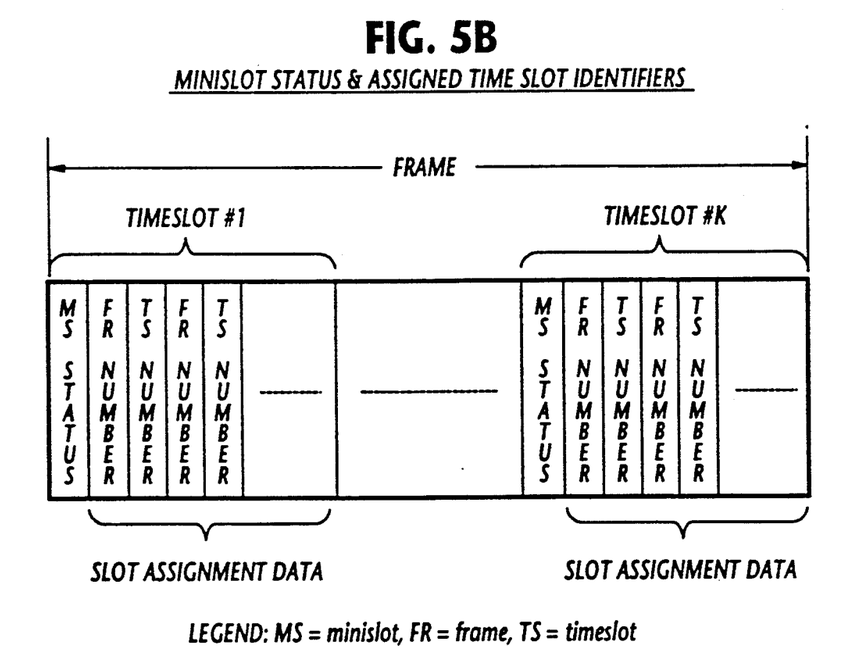

As shown in FIG. 5A, timeslot status table 22 defines a map indicating busy/idle status of each time slot for a series of frames #1 through #N. Using the busy/idle data, slot assignment circuit 21 detects idle timeslots and selects as many timeslots from the detected idle timeslots as there are required timeslots informed by decision circuit 10 and generates, for each frame, minislot status data indicating the busy/idle status of all minislots contained in that frame and slot assignment data containing frame and timeslot numbers of timeslots (FIG. 5B) assigned in one lump (on an en bloc basis) to user stations.

The data generated by slot assignment circuit 21 is stored into a buffer 23 in a location determined by an address pointer supplied from slot counter 20 and is output to multiplexer 14 in response to a frame timing signal from timing circuit 17 and multiplexed into the minislot data subfield 301 and timeslot assignment subfield 302 of an appropriate frame.

Figure 6:
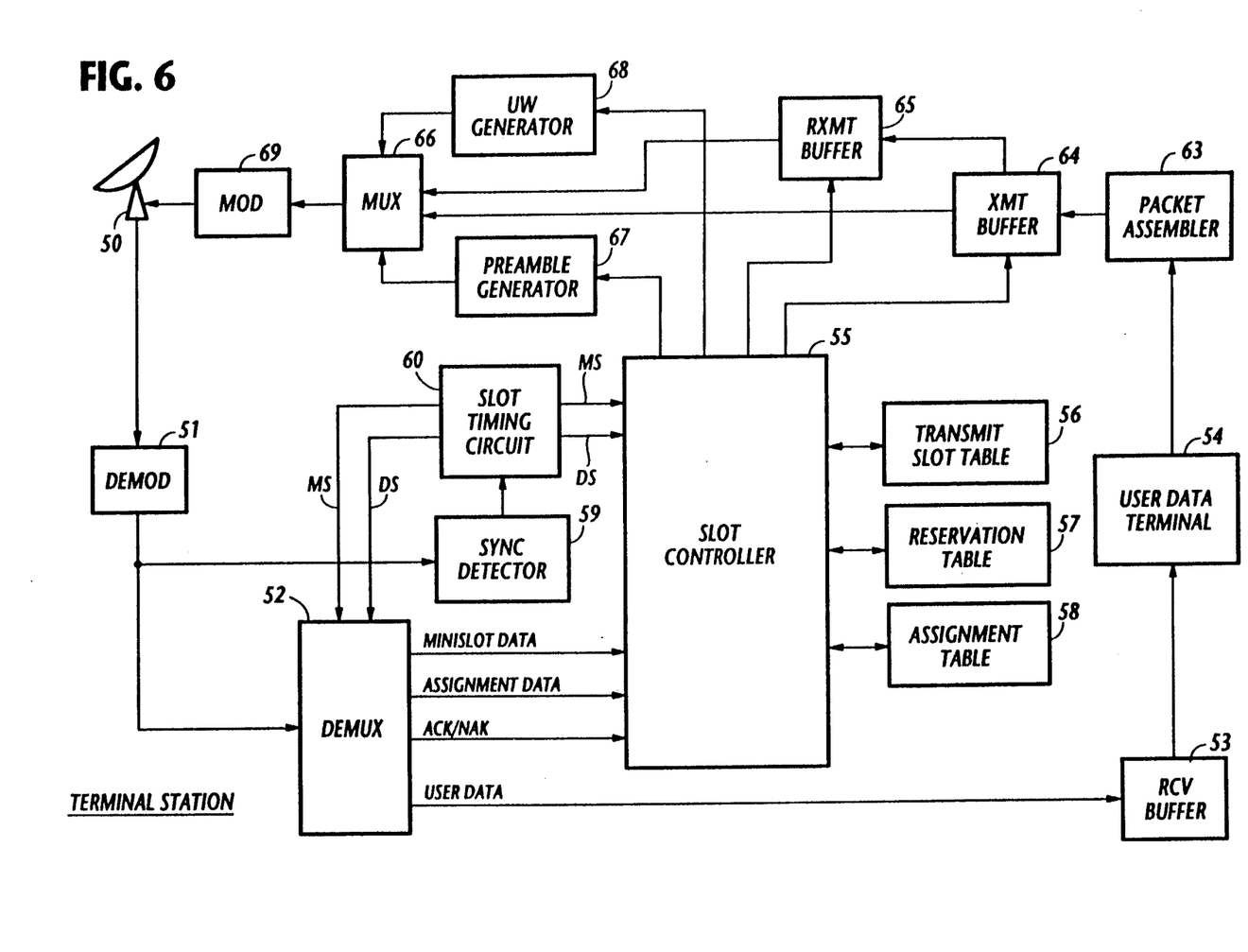
FIG. 6 is a block diagram of the terminal stations of the system.

FIG. 6 is a block diagram of each terminal station. A downlink signal from the satellite is received by an antenna system 50 identical to the central station, the intermediate frequency version of the received signal being applied to a demodulator 51 for baseband frequency conversion. The baseband signal is applied to a frame sync detector 59 whose output is coupled to a slot timing circuit 60 to produce dataslot and minislot timing signals DS and MS. The output of demodulator 51 is also applied to a demultiplexer 52 which responds to the timing signals DS and MS to decompose each of the received frames into the control field and the data fields. User data contained in a data field addressed to the terminal station is applied to a receive buffer 53 where it is held until it is called upon by a user data terminal 54. ACK/NAK data indicating the result of transmission of a previous packet from the terminal station is applied to a slot controller 55, and the minislot data and assigned timeslot ID data of the frame are supplied to slot controller 55. As will be described, slot controller 55 is associated with transmit slot table 56, a timeslot reservation table 57 and a timeslot assignment table 58 to control retransmission of a packet which was previously transmitted and corrupted by collision with other packets.

User data supplied from data terminal 54 is packetized through a packet assembler 63 and fed into a transmit buffer 64. Slot controller 55 determines the identifier of a timeslot on which the packet is sent and stores it into a transmit slot table 56 by setting a 1 into a corresponding timeslot position. For each transmission of a packet from the transmit buffer 64, a copy of the transmitted packet is read out of buffer 64 into a retransmit buffer 65. Slot controller 55 checks the ACK/NAK data from the central station with a corresponding timeslot identifier to determine the identify of the ACK/NAK data and discards a corresponding packet from the retransmit buffer 65 if an ACK signal is received. If a NAK is received, slot controller 55 causes a corresponding packet to be transmitted from the retransmit buffer 65.

The packet from either of the buffers 64 and 65 is input to a multiplexer 66 where it is combined with outputs of a preamble generator 67 and a unique word generator 68 which are respectively activated at appropriate minislot and dataslot transmit timing under the control of slot controller 55 using timing signals from slot timing circuit 60. The multiplexed signal is output through a modulator 69 to the antenna system 50 for transmission to the satellite.

Figure 7A:
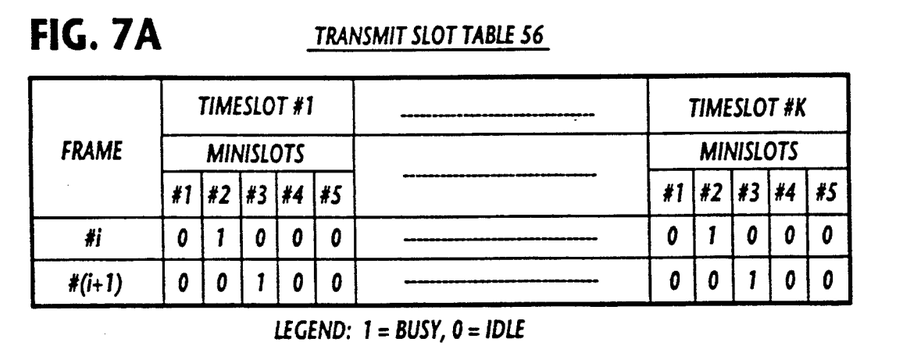
FIGS. 7A, 7B and 7C show details of the transmit slot table, reservation table and assignment table, respectively, of FIG. 6.
Figure 7B:
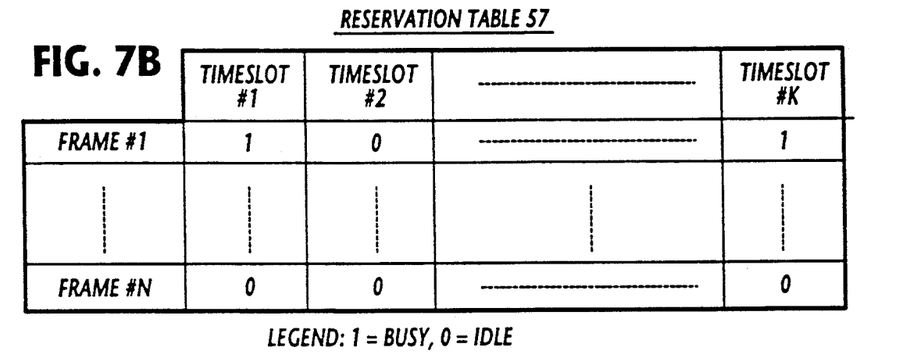
Figure 7C:
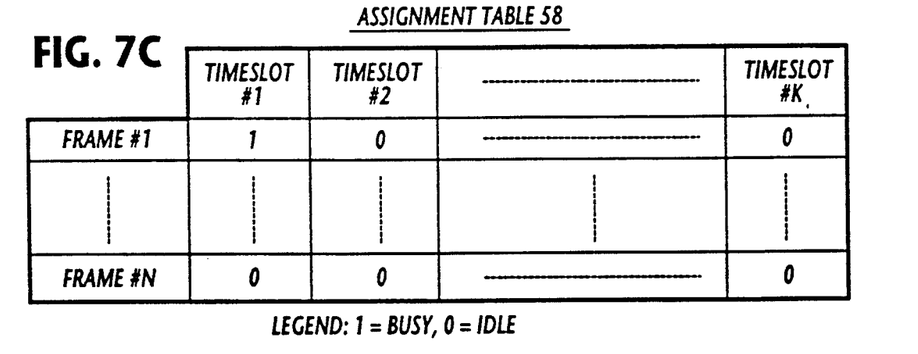

Details of the transmit slot table 56, reservation table 57 and assignment table 58 are shown in FIGS. 7A, 7B and 7C, respectively. These tables are constantly updated by slot controller 55. Transmit slot table 56 stores a list of busy/idle status of each minislot (#1 through #5) of all timeslots (#1 through #K) which are contained in frames #i and #(i+1). A binary 1 is set into a minislot entry if the corresponding minislot is used by the terminal station. Reservation table 57 stores a map indicating the busy/idle status of each timeslot which is used in any of the terminal stations for frames #1 through #N. Assignment table 58 indicates the busy/idle status of each timeslot which is assigned only to the home terminal station by which the table 58 is owned, and the list is maintained for frames #1 through #N.

Figure 8:
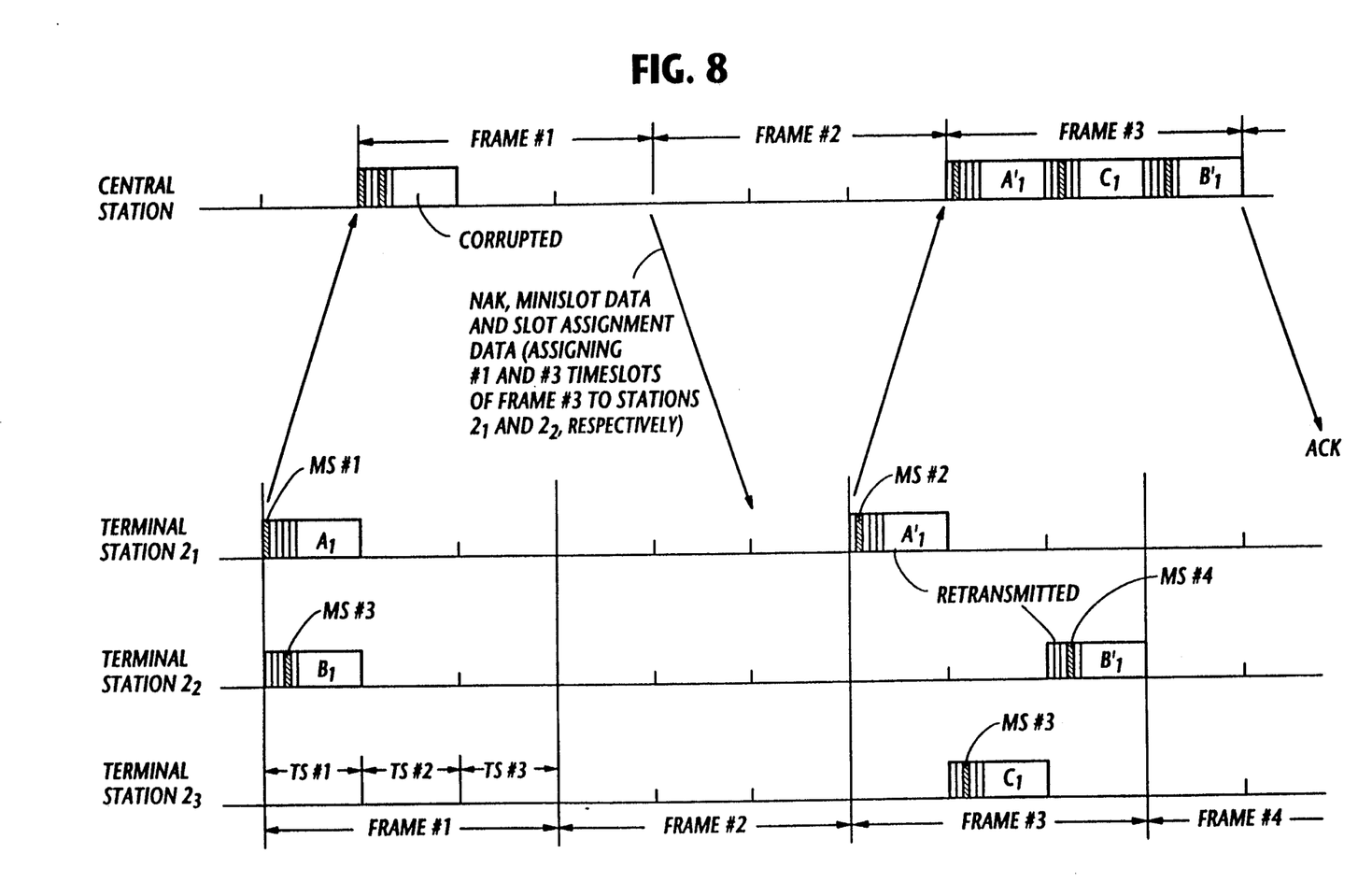
FIG. 8 is a message flow diagram useful for briefly describing the operation of the system.

Before going into details of the functions and operations of slot controller 55, the overall operation of the system will be given below with reference to a message flow diagram shown in FIG. 8. Assume that terminal stations $2_1$ and $2_2$ transmitted packets $A_1$ and $B_1$ during timeslot #1 of frame #1, using minislots #1 and #3, respectively. As they collide at the central station, the latter sends back data containing a NAK, minislot data and slot assignment data assigning #1 and #3 timeslots of frame #3 to terminal stations $2_1$ and $2_2$, respectively. The response signal from the central station reaches the terminal stations during frame #2. Upon receipt of each response, terminal station $2_1$ retransmits the packet as $A'_1$ on timeslot #1 using minislot #2, and terminal station $2_2$ retransmits the packet as $B'_1$ on timeslot #3 using minislot #4. If there is a packet $C_1$ to transmit from terminal station $2_3$ during timeslot #2 of frame #3, it looks up timeslot reservation table 57 to recognize that timeslot #1 of the frame has been reserved for another station and timeslot #2 can be used for random access, and waits until timeslot #2 to transmit the packet $C_1$ using minislot #3.

Figure 9:
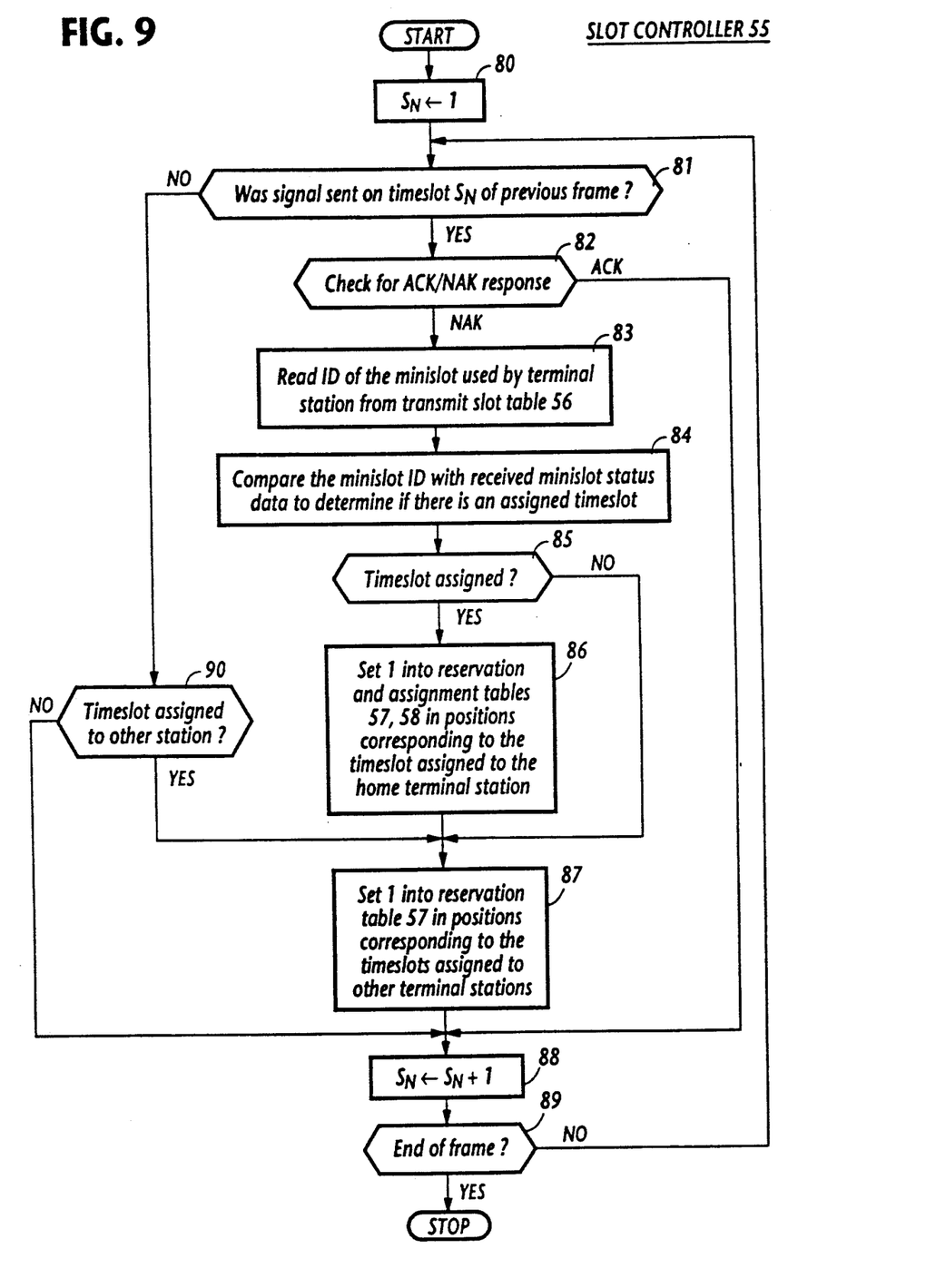
FIG. 9 is a flowchart showing programmed instructions executed by the slot controller of FIG. 6 when the transmit slot table, reservation table and assignment table are updated.
Figure 10:
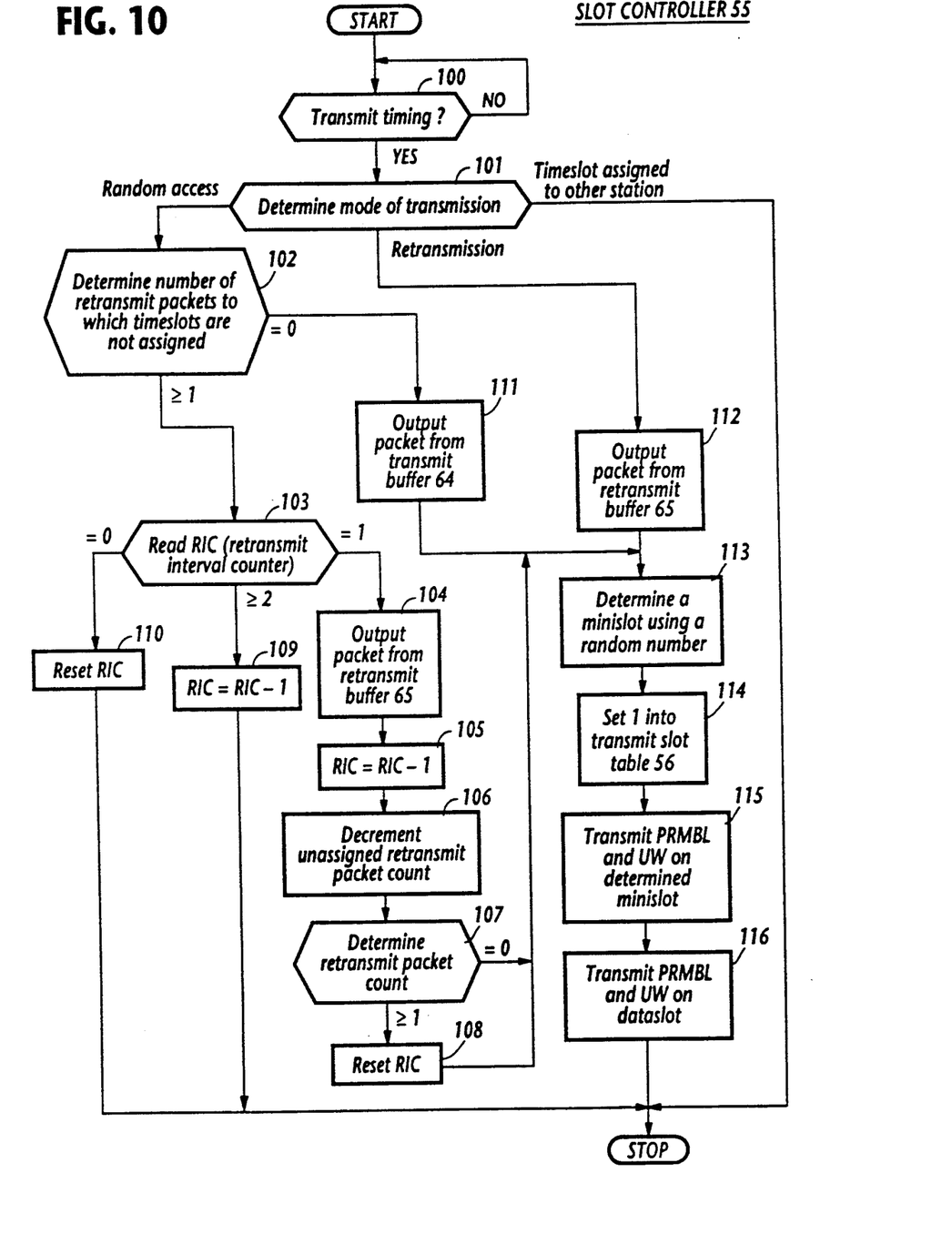
FIG. 10 is a flowchart showing programmed instructions executed by the slot controller when a packet is transmitted from a terminal station.

FIGS. 9 and 10 are flowcharts describing programmed instructions which are executed by the slot controller 55. In FIG. 9, during a given frame interval "i", the program execution begins with step 80 in which variable $S_N$, that indicates the identifier of a timeslot, is set equal to 1. Exit then is to step 81 to check to see if a packet was sent on time slot $S_N$ of the (i−1)th frame by examining the transmit slot table 56. If the answer is affirmative, control branches at step 81 to step 82 to check to see if there is an ACK or NAK response from the central station regarding the transmitted packet. If the response is a positive acknowledgment, control branches at step 82 to step 88 to increment variable $S_N$ by one and returns to the starting point of the program if the program execution is does not reach the end of the "1th" frame (step 89). If the response from the central station is a negative acknowledgment, control branches at step 82 to step 83 to access transmit slot table 56 and read the minislot identifier which was previously used by the terminal station. Control proceeds to step 84 to compare the minislot identifier with received minislot data. Since the minislot data indicates the busy/idle status of all minislots of the timeslot on which the previous packet was sent, the terminal station determines the position of the minislot previously used relative to the positions of other minislots which are used by other, contending terminal stations. Using the position of the minislot so determined, one of timeslots, which are assigned to all the contending stations but not respectively identified for one-to-one relationship, is now identified as one to be used for retransmission.

The result of the timeslot determination is checked (step 85). If timeslots are assigned and one of them is successively identified, control branches at step 85 to step 86 to set a 1 into reservation and assignment tables 57 and 58 in positions corresponding to the timeslot successfully identified by step 84. If the timeslot determination fails or after the execution of step 86, control exits to step 87 to set a 1 into reservation table 57 in positions corresponding to the timeslots assigned to the other terminal stations.

If no packet was sent on timeslot $S_N$ of the (i−1)th frame, control branches at step 81 to step 90 to check to see if received timeslot assignment data indicates timeslots assigned to other terminal stations. If the answer is affirmative, control branches to step 87 to set a 1 into corresponding positions of the reservation table 57. Otherwise, control branches to step 88. The process is repeated until all timeslots are examined.

Figure 7D:
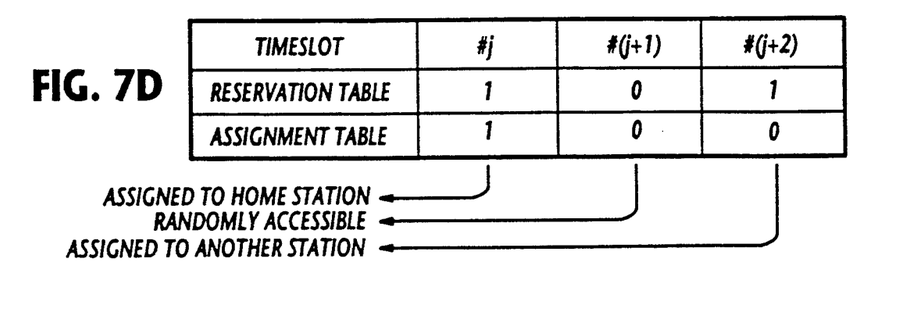
FIG. 7D shows bit combinations organized from the reservation and assignment tables to determine the mode of transmission of each timeslot.

In FIG. 10, the program execution starts with decision step 100. If appropriate transmit timing is reached for a given timeslot, control branches to step 101 to determine the mode of transmission of a packet during the given timeslot by examining the reservation and assignment tables 57 and 58. Specifically, the busy/idle status bits of the current frame are read out of corresponding frame entries of both tables 57 and 58 and organized column-by-column as shown in FIG. 7D. Then, a search is made along the column entry of the current timeslot for a bit combination "11", "00" or "10". The bit combination "11" indicates that the current timeslot #j is one that is assigned to the home terminal station, and "00" indicates that the current slot #(j+1) can be used for random packet transmission, and "10" indicates that the current slot #(j+2) is one assigned to another terminal station.

If the current timeslot is determined to be the one that can be used for random transmission, control branches at step 101 to step 102 to determine a count indicating the number of retransmit packets to which timeslots are not assigned. Such unassigned retransmit packets occur when the terminal station receives a NAK under condition that the central station detected no burst transmission in any of the minislots (see block 41, FIG. 4).

If the retransmit packet count is equal to or greater than 1, control branches to step 103 to read the count of a retransmit interval counter RIC. If the RIC count is equal to 1, then a packet is output from retransmit buffer 65 (step 104) and the RIC counter is decremented by one (step 105) and the unassigned retransmit packet count is decremented (step 106). The number of retransmit packet is then determined (step 107) and if it is equal to 0, control branches to step 113. If it is equal to or greater than 1, control branches to step 108 to reset the RIC counter to a random number equal to or greater than 1, and control proceeds to step 113.

If the RIC count is determined to be equal to or greater than 2, it is decremented by one (step 109) and control proceeds to the end of the program. If the RIC count is determined to equal to 0, it is reset to a random number equal to or greater than 1 (step 110), and control proceeds to the end of the program.

If the number of retransmit packets is determined to be equal to 0, control branches at step 102 to step 111 to output a new packet from the transmit buffer 64, and control proceeds to step 113 to generate a random number and select a minislot corresponding to the random number. Exit then is to step 115 to successively activate preamble generator 67 and UW generator 68 and transmit a preamble followed by a unique word on the selected minislot of the current timeslot. Following the transmission of the minislot, preamble generator 67 and UW generator 68 are activated again to transmit a preamble and a unique word respectively in the subfields 206 and 207 of the subsequent dataslot of the current timeslot (step 116), and control goes to the end of the program.

If the current timeslot is determined to be a slot for retransmission, control branches at step 101 to step 112 to output a packet from the retransmit buffer 65 and steps 113 to 116 are successively executed.

If the current timeslot is determined to be the one assigned to other terminal station, control branches at step 101 to the end of the program.

What is claimed is:

1. A random access communication system comprising:
   a central station; and
   a plurality of user stations, each of the user stations transmitting a packet to said central station on a randomly selected timeslot of a time-division multiple access channel, the user station defining a plurality of short-duration slots within said selected timeslot and transmitting a burst on one of said short-duration slots,
   said central station monitoring the defined short-duration slots to detect said burst transmission, assigning as many timeslots as required if more than one burst transmission is detected within a same timeslot, and transmitting a slot assignment signal to said user stations containing a negative acknowledgement of said transmitted packet,
   said user station from which said packet was transmitted being responsive to said negative acknowledgement for selecting one of the assigned timeslots and retransmitting to said central station a copy of said packet on the selected assigned timeslot,
   wherein said central station transmits a status signal indicating a status of each of said defined short-duration slots, the packet-sending user station being responsive to said status signal for determining a relative position of the short-duration slot on which the burst was transmitted and selecting one of the assigned timeslots according to the determined position.

2. A random access communication system as claimed in claim 1, wherein a plurality of said timeslots are organized into successive frames, and each of said user stations includes:
   table means for holding a usage status record of the user station, said record indicating presence and absence of a burst transmission of the user station on each of the short-duration slots; and
   control means for checking said status signal from said central station with said usage status record to determine said relative position of the short-duration slot on which said burst was transmitted.

3. A random access communication system as claimed in claim 1, wherein said central station includes means for detecting an error in said packet, and means for transmitting said negative acknowledgement under conditions that (1) said burst transmission is not detected in any of said short-duration slots, and that (2) said burst transmission is detected only in one of said short-duration slots and said error is detected in said packet, the packet-sending user station being responsive to said negative acknowledgement transmitted under said conditions for retransmitting a copy of the packet on a randomly selected timeslot.

4. A random access communication system as claimed in claim 3, each of said user stations further includes:
   table means for holding a reservation status record of all user stations of the system, said reservation status record indicating assignment of a timeslot to all user stations and for holding an assignment status record of the user station, said assignment status record indicating unique assignment of a timeslot to the user station; and mode determining means for determining a packet transmission mode according to the reservation status record and said assignment status record.

5. A random access communication system as claimed in claim 4, wherein each of said user stations comprises:
   a transmit buffer for holding packets waiting for initial transmission;
   a retransmit buffer for holding copies of the packets initially transmitted from said transmit buffer;
   means for determining a count indicating the number of packets in said retransmit buffer to which packets timeslots are not assigned by the central station if said packet transmission mode is determined by said mode determining means to be a random access mode;
   means for transmitting a packet from said transmit buffer on a randomly selected timeslot if said count is equal to zero;
   means for determining an interval between successive packet transmissions from said retransmit buffer if said count is equal to or greater than unity; and
   means for transmitting a packet from said retransmit buffer on a randomly selected timeslot if said interval corresponds to a prescribed value.

6. A random access communication system as claimed in claim 3, wherein each of said user stations comprises:
   a transmit buffer for holding packets waiting for initial transmission;
   a retransmit buffer for holding copies of the packets initially transmitted from said transmit buffer;
   means for determining a packet transmission mode during each successive timeslot;
   means for determining a count indicating the number of packets in said retransmit buffer to which packets timeslots are not assigned by the central station if said packet transmission mode is determined by said mode determining means to be a random access mode;
   means for transmitting a packet from said transmit buffer on a randomly selected timeslot if said count is equal to zero;
   means for determining an interval between successive packet transmissions from said retransmit buffer if said count is equal to or greater than unity; and
   means for transmitting a packet from said retransmit buffer on a randomly selected timeslot if said interval corresponds to a prescribed value.

7. A random access communication system as claimed in claim 1, wherein said burst transmission from each of the user stations contains a predetermined bit sequence.

8. A satellite communications system comprising:
   a central station; and
   a plurality of user stations, each of the user stations transmitting a packet to said central station via a communications satellite on a randomly selected timeslot of a time-division multiple access channel, the user station defining a plurality of short-duration slots within said selected timeslot and transmitting a burst on one of said short-duration slots,
   said central station monitoring the defined short-duration slots to detect said burst transmission, assigning as many timeslots as required if more than one burst transmission is detected within a same timeslot, and transmitting a slot assignment signal to said user stations containing a negative acknowledgement of said transmitted packet,
   said user station from which said packet was transmitted being responsive to said negative acknowledgment for selecting one of the assigned timeslots and retransmitting to said central station a copy of said packet on the selected assigned timeslot,
   wherein said central station transmits a status signal indicating a status of each of said defined short-duration slots, the packet-sending user station being responsive to said status signal for determining a relative position of the short-duration slot on which the burst was transmitted and selecting one of the assigned timeslots according to the determined position.

9. A satellite communications system as claimed in claim 8, wherein a plurality of said timeslots are organized into successive frames, each of said user stations includes:
   table means for holding a usage status record of the user station, said record indicating presence and absence of a burst transmission of the user station on each of the short-duration slots; and
   control means for checking said status signal from said central station with said usage status record to determine said relative position of the short-duration slot on which said burst was transmitted.

10. A satellite communications system as claimed in claim 8, wherein said central station includes means for detecting an error in said packet, and means for transmitting said negative acknowledgment under conditions that (1) said burst transmission is not detected in any of said short-duration slots, and that (2) said burst transmission is detected only in one of said short-duration slots and said error is detected in said packet, the packet-sending user station being responsive to said negative acknowledgment transmitted under said conditions for retransmitting a copy of the packet on a randomly selected timeslot.

11. A satellite communications system as claimed in claim 10, each of said user stations further includes:
   table means for holding a reservation status record of all user stations of the system, said reservation status record indicating assignment of a timeslot to all user stations and for holding an assignment status record of the user station, said assignment status record indicating unique assignment of a timeslot to the user station; and
   mode determining means for determining a packet transmission mode according to the reservation status record and said assignment status record.

12. A satellite communications system as claimed in claim 11, wherein each of said user stations comprises:
   a transmit buffer for holding packets waiting for initial transmission;
   a retransmit buffer for holding copies of the packets initially transmitted from said transmit buffer;
   means for determining a count indicating the number of packets in said retransmit buffer to which packets timeslots are not assigned by the central station if said packet transmission mode is determined by said mode determining means to be a random access mode;
   means for transmitting a packet from said transmit buffer on a randomly selected timeslot if said count is equal to zero;

means for determining an interval between successive packet transmissions from said retransmit buffer if said count is equal to or greater than unity; and means for transmitting a packet from said retransmit buffer on a randomly selected timeslot if said interval corresponds to a prescribed value.

13. A satellite communications system as claimed in claim 10, wherein each of said user stations comprises:

a transmit buffer for holding packets waiting for initial transmission;

a retransmit buffer for holding copies of the packets initially transmitted from said transmit buffer;

means for determining a packet transmission mode during each successive timeslot;

means for determining a count indicating the number of packets in said retransmit buffer to which packets timeslots are not assigned by the central station if said packet transmission mode is determined by said mode determining means to be a random access mode;

means for transmitting a packet from said transmit buffer on a randomly selected timeslot if said count is equal to zero;

means for determining an interval between successive packet transmissions from said retransmit buffer if said count is equal to or greater than unity; and means for transmitting a packet from said retransmit buffer on a randomly selected timeslot if said interval corresponds to a prescribed value.

14. A satellite communications system as claimed in claim 8, wherein said burst transmission from each of the user stations contains a predetermined bit sequence.

* * * * *